United States Patent [19]
Lee

[11] 3,826,300
[45] July 30, 1974

[54] LIGHT SEAL FOR HAND OPENINGS IN PHOTOGRAPHIC PROCESSING EQUIPMENT

[75] Inventor: Conrad E. Lee, Mound, Minn.

[73] Assignee: Pako Corporation, Minneapolis, Minn.

[22] Filed: Feb. 7, 1973

[21] Appl. No.: 330,179

[52] U.S. Cl. .................................. 95/1 R, 95/91
[51] Int. Cl. ................................... G03d 17/00
[58] Field of Search ............... 95/1, 91, 92; 312/1; 128/1; 160/DIG. 8

[56] References Cited
UNITED STATES PATENTS

| | | | |
|---|---|---|---|
| 1,446,762 | 2/1923 | Morykwas | 95/92 |
| 2,560,661 | 7/1951 | Poovey | 160/DIG. 8 |
| 2,699,826 | 1/1955 | Emerson | 160/DIG. 8 |
| 3,314,352 | 4/1967 | Grant | 95/91 X |

*Primary Examiner*—John M. Horan

[57] ABSTRACT

This is a light seal for sealing hand access openings for photographic processing equipment and specifically includes four triangular panels made from elastic material respectively arranged 90° out of phase around a square opening with the free marginal edge portions thereof having a substantial light sealing overlap provided with an elastic reinforcement and constitutes an improvement over the light seal disclosed in the U.S. Pat. to Grant, No. 3,314,352.

1 Claim, 4 Drawing Figures

PATENTED JUL 30 1974 3,826,300
FIG. 1
FIG. 2
FIG. 3
FIG. 4
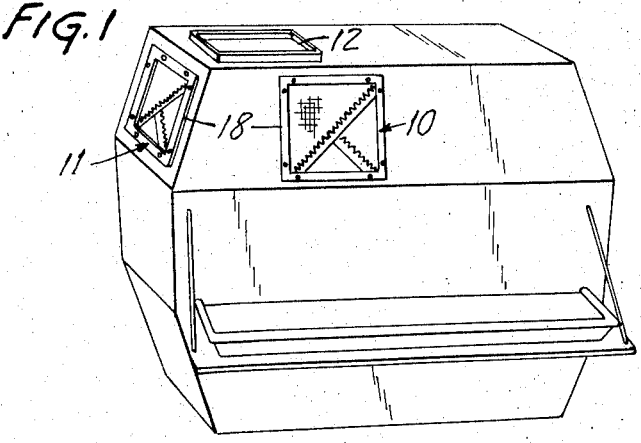
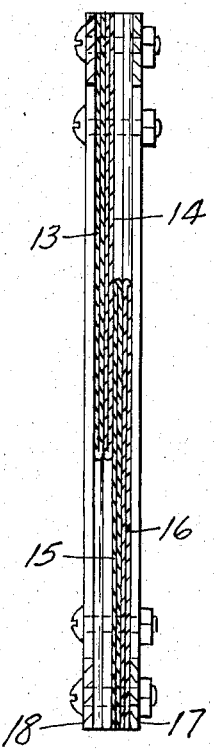
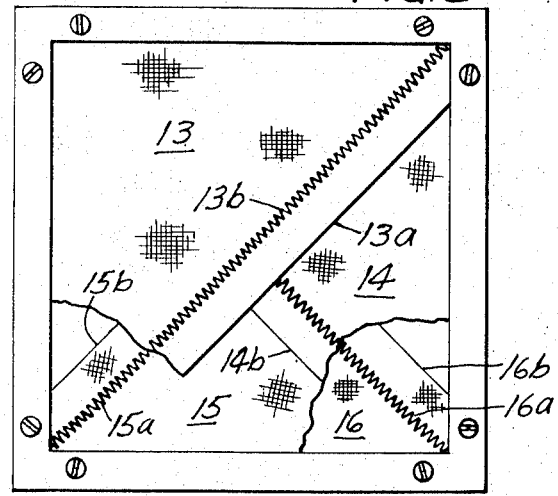
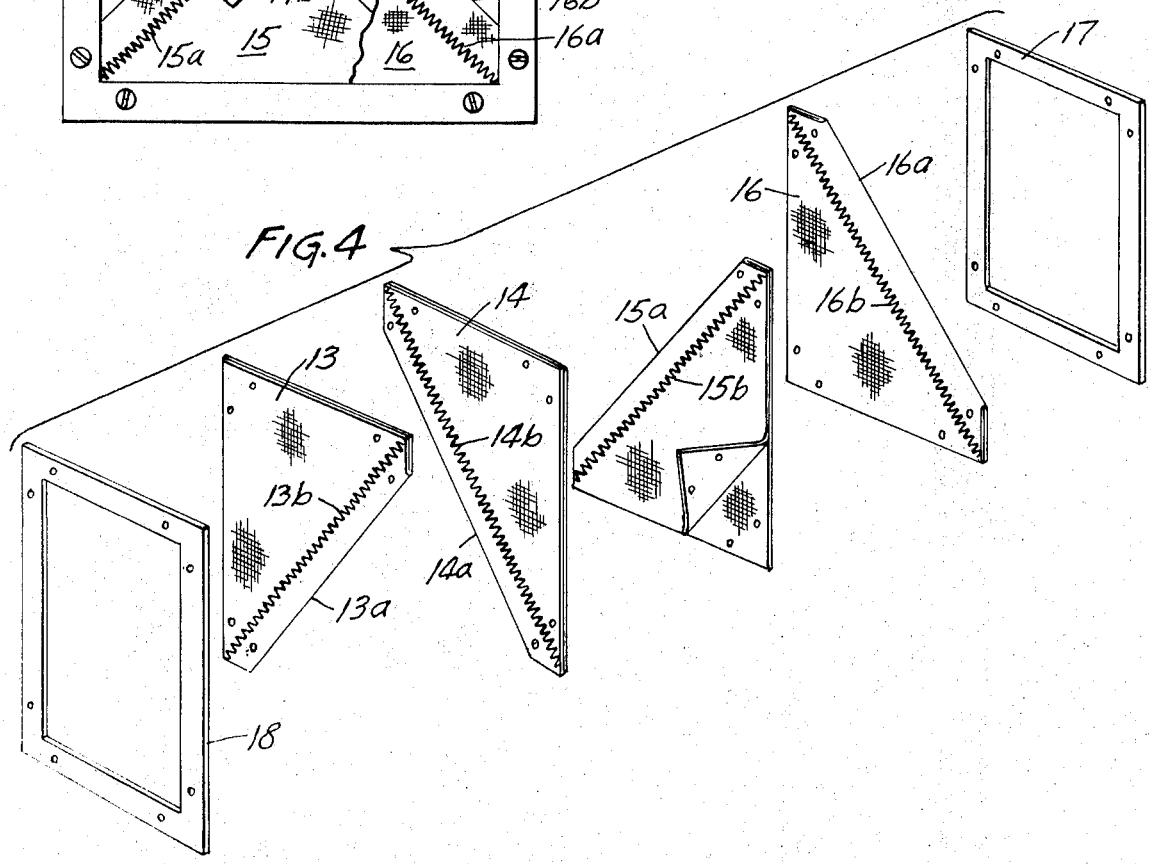

LIGHT SEAL FOR HAND OPENINGS IN PHOTOGRAPHIC PROCESSING EQUIPMENT

The light seal shown in said Grant U.S. Pat. No. 3,314,352 constitutes the principal prior art with which applicant is familiar. In the Grant Patent however the triangular diaphragm elements are single ply rubber sheet members and it has been found that the sealing edges of these members become stretched and do not provide the required seal at the center of the opening. In addition the hypotenuse of each of the triangular sealing elements of the Grant Patent extends directly across the diagonals of the square openings without providing any overlap.

It is an object of this invention to provide an improved light seal for hand access openings in photographic equipment and is specifically designed to provide a durable long lasting seal which will maintain its positive sealing properties for substantially longer periods of time than the prior art seals presently in use.

It is an object of the present invention to provide an improved light seal for hand openings in photographic equipment embodying four triangular elastic sealing elements mounted in a clamping frame with the clamped right angle edge portions of the respective sealing elements being oriented in profressively 90° out of phase relationship with respect to each other and provided with a substantial overlap at the center junction areas and provided with durable elastic reinforcement disposed substantially along the diagonals of the square opening in order to provide a reinforced diagonal marginal edge portion which will maintain its sealing elasticity for relatively long periods of time.

These and other objects and advantages of this invention will more fully appear in the following description made in connection with the accompanying drawings in which like reference characters refer to similar parts throughout the several views, and, in which:

FIG. 1 is a view of a film processor for dental films and the like having a pair of hand openings therein equiped with improved light seals embodying this invention;

FIG. 2 is a front elevational view of one of the light seals with portions broken away;

FIG. 3 is a vertical sectional view of said light seal;

FIG. 4 is an exploded perspective view showing the orientation of the sealing elements before final assembly in the clamping frame.

A specific embodiment of a dental film processor P is illustrated in FIG. 1 having two hand openings 10 and 11 formed therein with a viewing window 12 in the top thereof. The viewing window is, of course, approprietly filtered to prevent harmful light rays from reaching the inside of the processor and the hand openings 10 and 11 are provided with my improved light seal.

The light seal is formed from four substantially triangular elastic sealing elements respectively designated by the numerals 13, 14, 15 and 16. Each of the elements is made from a double thickness elastic opaque stretch fabric material and is formed from a square of such material slightly larger than the size of the square opening to be sealed. This square is doubled back upon itself to form a right triangle with the hypotenuse being formed by the doubled back or folded edge. These edges are respectively designated by the reference characters 13a, 14a, 15a and 16a. The ends of the triangles are then trimmed so that the lengths of the respective legs of each triangle is the same as the outside dimension of each side of the square clamping frame members 17 and 18. This provides for a sealing overlap by the respective elements 13, 14, 15 and 16 which positively prevents the passage of light through the center of the opening.

An important part of the invention constitutes the elastic reinforcement which in the form shown consists in elastic "zig-zag" stitching designated by the reference characters 13b, 14b, 15b and 16b. This elastic reinforcement is positioned along the diagonals of the square opening in order to facilitate inserting the hands through the opening. In other words if the reinforcement were in the extreme edges 13a, 14a, 15a and 16a of the overlapping portion it would be considerably more difficult to insert the arm therethrough and considerably less comfortable for the operator.

As best shown in FIGS. 2 and 4 the substantially triangular sealing elements 13, 14, 15 and 16 are assembled between the clamping members 17 and 18 and are oriented in progressively 90° out of phase relationship so that the two opposed elements 13 and 15 have a substantial overlap at the center and the other two opposed elements 14 and 16 have a similar overlap at the center with the elastic reinforcement of opposed pairs of elements (13 and 15) and (14 and 16) being disposed in respective registration.

It will be seen that I have provided an improved yet relatively simple light seal for hand openings for photographic equipment and the like which is specifically constructed to provide a durable long wearing positive seal even after relatively long periods of use while still permitting easy and comfortable access by the operator.

It will, of course, be understood that various changes may be made in the form, details, arrangement and proportions of the parts without departing from the scope of this invention which is defined by the appended claims.

What is claimed is:

1. A light seal for a hand opening in photographic processing equipment comprising
   two pairs of light opaque sealing elements,
   each element being made from a square piece of elastic stretch fabric and doubled back upon itself along a diagonal fold line to form a diagonally disposed straight edge,
   the edges of each pair of elements being disposed in parallel relation and overlapping each other and being disposed at substantially right angles to edges of the other pair of elements to provide an overlapped seal across the opening,
   means for anchoring in light sealing relation to the outer edges of the sealing elements around the hand openings.

* * * * *